United States Patent [19]

Rittenberry et al.

[11] Patent Number: 4,704,609
[45] Date of Patent: Nov. 3, 1987

[54] GENERAL PURPOSE SENSOR SCANNING APPARATUS

[76] Inventors: Gary M. Rittenberry, 11222 E. Wesleyan, Tempe, Ariz. 85282; Dennis J. Bakken, 623 N. Kristin, Chandler, Ariz. 85224

[21] Appl. No.: 746,729

[22] Filed: Jun. 20, 1985

[51] Int. Cl.⁴ .............................................. G08C 19/16
[52] U.S. Cl. .......................... 340/870.13; 340/870.10; 340/870.15; 340/870.17; 340/825.10
[58] Field of Search ........................ 340/870.13, 870.10, 340/870.17, 365 S, 870.15, 825.10; 370/58; 346/33 R, 33 TP; 374/103, 114, 102

[56] References Cited

U.S. PATENT DOCUMENTS

| | | | |
|---|---|---|---|
| 3,848,188 | 11/1974 | Ardezzone et al. | 340/870.13 |
| 4,037,199 | 7/1977 | Rozehnal et al. | 340/870.13 |
| 4,040,059 | 8/1977 | Simons et al. | 340/870.13 |
| 4,158,810 | 1/1979 | Leskovar | 340/870.13 |
| 4,163,216 | 7/1979 | Arpino | 340/870.13 |
| 4,262,287 | 4/1981 | McLoughlin et al. | 340/870.13 |
| 4,563,682 | 1/1986 | Merkel | 340/870.17 |
| 4,591,833 | 5/1986 | Ishii et al. | 340/365 S |

Primary Examiner—John W. Caldwell, Sr.
Assistant Examiner—Mahmoud Fatahi-yar
Attorney, Agent, or Firm—Don J. Flickinger; Jordan M. Meschkow

[57] ABSTRACT

A scanning device is capable of monitoring a plurality of sensors each of which generate a voltage representative of the parameter being monitored. Multiplexers are provided for continually scanning the sensor channels and displaying the appropriate measurement on a display monitor. Circuitry is provided for converting the displayed measurement from a pure voltage to a temperature. Additionally, switches are provided for causing the scanner to scan only a desired number of channels. Stop channel select switches are provided to cause the scanner to stop on a desired channel, and a light emitting diode display indicates exactly what channel is being monitored.

6 Claims, 1 Drawing Figure

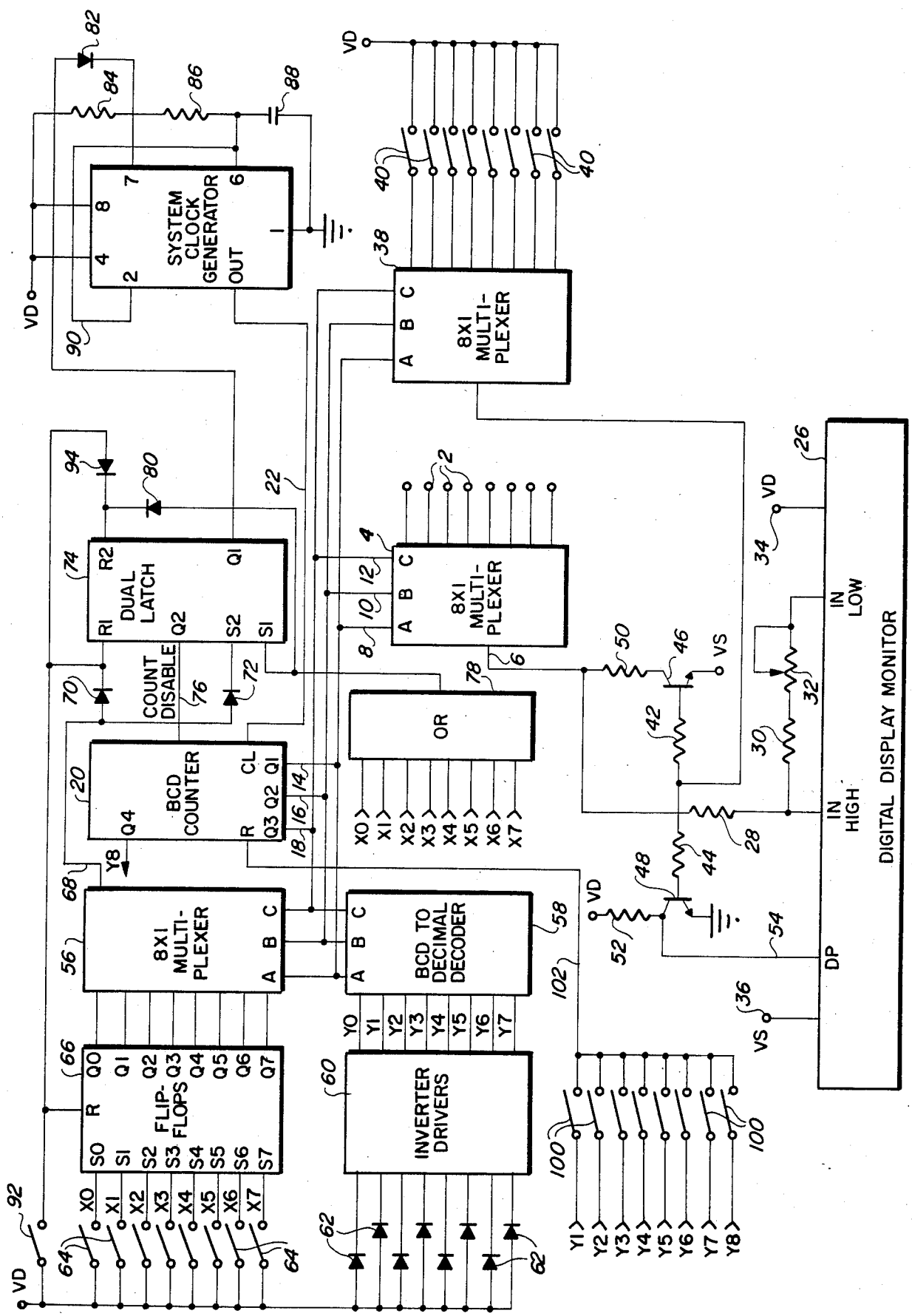

GENERAL PURPOSE SENSOR SCANNING APPARATUS

BACKGROUND OF THE INVENTION

Field of the Invention

This invention relates generally to scanning devices, and more particularly to a general purpose user definable scanning device for measuring temperature, pressure, frequency, etc., or any other parameter which may be converted to and represented by a voltage.

Scanning devices which sequentially monitor a plurality of parameters are known. Such known devices generally employ expensive sensors and complex circuitry such as thermocouples which require an internal lookup table for the generation of desired output. Some such device utilize a plurality of variable resistors or pots which require frequent adjustment. In some instances, the device must be returned to the manufacturer for such adjustment.

In addition to requiring an extraordinary amount of calibration, known scanning devices can generally only measure fixed parameters. That is, the devices are not versatile, and the user cannot vary the parameter's measuring to accommodate different user applications.

Finally, such known scanning devices are not configured so as to be capable of use in conjunction with state-of-the-art temperature sensors which generate a voltage output and therefore do not require conversion.

SUMMARY OF THE INVENTION

It is an object of the present invention to provide an improved scanning device.

It is a further object of the present invention to provide a general purpose scanning device which incorporates user definable channels.

It is a still further object of the present invention to provide an improved scanning device which is relatively inexpensive and does not require complex circuitry.

A still further object of the present invention is to provide an improved scanning device of the type wherein the user may select the number of channels scanned.

Yet another object of the present invention is to provide an improved scanning device wherein the user may terminate the scanning function and stop at a particular channel.

Yet another object of the present invention is to provide a scanning device which may be used in conjunction with state-of-the-art sensors which provide a voltage output.

A still further object of the present invention is to provide an improved scanning device which does not require a great deal of calibration.

According to a broad aspect of the invention there is provided an apparatus for scanning a plurality of parameters, comprising first multi-plexer means including a first plurality of channels, each channel having an input coupled to receive a signal representative of one of the plurality of parameters, the first multi-plexer means sequentially and repeatedly coupling each input to an output thereof; clock generator means coupled to the first multi-plexer means for controlling the rate at which the first multi-plexer repeatedly sequences through the first plurality of channels; first display means coupled to the output of the first multi-plexer means for displaying a digital representation of the value of each of the plurality of parameters; and means for varying the number of the first plurality of channels which are repeatedly and sequentially scanned.

BRIEF DESCRIPTION OF THE DRAWINGS

The above and other objects, features, and advantages of the present invention will be more clearly understood from the following detailed description taken in conjunction with the accompanying drawings which is a functional block diagram of the inventive scanning apparatus.

DESCRIPTION OF THE PREFERRED EMBODIMENT

Referring to the drawing, a plurality of input terminals 2 (e.g., eight input terminals) are each coupled to the outputs of a plurality of sensors (e.g., of the type manufactured by National Semiconductor Corporation and bearing part numbers LM34 and LM35) each of which generate a voltage indicative of the parameter being measured by the individual sensor. These voltages are applied via input terminals 2 to an 8-1 multi-plexer 4 which provides a single output 6. Multiplexer 4 is controlled by first, second and third inputs 8, 10 and 12 which correspond respectively to first, second and third outputs 14, 16 and 18 of BCD counter 20. Outputs 14, 16 and 18 of BCD counter correspond to the outputs of three least significant bits (Q1, Q2 and Q3) of BCD counter 20. Counter 20 receives a clock signal at its clock input (CL) over line 22 which is generated by system clock generator 24 to be discussed in more detail below. Thus, each signal appearing at input terminal 2 to multiplexer 4 will appear at output 6 when a specific and unique combination of inputs 8, 10 and 12 are provided by BCD counter 20. Both multiplexer 4 and BCD counter 20 are commericially available devices which may, for example, be purchased from Motorola, Inc. and bearing part numbers MC14051B and MC14510B respectively.

Output 6 of multi-plexer 4 is applied to the IN HIGH and IN LOW inputs of a digital display monitor 26 via an input attenuator circuit including resistors 28 and 30. As can be seen, digital display monitor 26 includes terminals 34 and 36 for coupling to sources of supply voltage VD and VS, for example 5 volts and −4 volts respectively. It should be noted at this point that all of the remaining blocks in the diagram comprise circuitry which is also coupled to a source of supply voltage VD although not specifically shown in the drawing.

Resistors 28 and 30 comprise a precision decade resistor voltage divider, of the type supplied by Caddock Electronics, Inc. and bearing part number 1776-82.

Also shown in the drawing is a second 8-1 multi-plexer 38 which may be identical to multi-plexer 4. Multiplexer 38 is similarly controlled by the Q1, Q2 and Q3 outputs 14, 16 and 18 from BCD counter 20. Thus, both multiplexere 4 and 38 are operated in a synchronous fashion. Multiplexer 38 includes a plurality of inputs (for example 8) each coupled to one terminal of a temperature select switch 40 the other terminal of which is coupled to the source of supply VD as shown. Thus, each temperature select switch 40 corresponds to a single specific channel 2 of multiplexer 4. If it should be desired that one or more of channels 2 are to be utilized to measure temperature instead of voltage, the corresponding temperature select switch is closed causing VD to be applied to the corresponding input of multiplexer 38. When this particular channel is chosen under the control of BCD counter 20, VD is supplied through resisters 42 and 44 to the base electrodes of NPN transistors 46 and 48 respectively causing transistors 46 and 48 to turn on. The collector of transistor 46 is coupled, via resistor 50, to output 6 of multiplexer 4. Transistor 46 functions to supply a bias to the chosen sensor through multiplexer 4. Transistor 48 which has a collector to VD via resistor 52 turns on causing a decimal point enable line 54 which is coupled to the decimal point (DP) input of digital display monitor 26 to go low. This merely disables the decimal point (i.e., causes it not to appear) on the digital display when a pure temperature readout is desired. For those channels wherein temperature select switch 40 is left open, neither transistor 46 or 48 will turn on causing decimal point enable line 54 to go high resulting in the digital display of a voltage including the decimal point.

Outputs Q1, Q2 and Q3 appearing on lines 14, 16 and 18 respectively of BCD counter 20 are also applied to an additional 8-1 multiplexer 56 which may be identical to multiplexers 4 and 38, and to a BCD to decimal decoder 58 of the type commercially available from Motorola, Inc. and bearing part number MC14028B. As is well known, the Q1, Q2 and Q3 outputs are capable of generating 8 unique codes each of which corresponds to a specific sensor channel. This is illustrated in Table 1 below.

TABLE 1

| Q3 | Q2 | Q1 | Channel |
|---|---|---|---|
| 0 | 0 | 0 | 1 |
| 0 | 0 | 1 | 2 |
| 0 | 1 | 0 | 3 |
| 0 | 1 | 1 | 4 |
| 1 | 0 | 0 | 5 |
| 1 | 0 | 1 | 6 |
| 1 | 1 | 0 | 7 |
| 1 | 1 | 1 | 8 |

Decoder 58 decodes the binary coded signal and in response thereto generates a channel signal at outputs Y0-Y7. That is, one channel signal will be activated for each specific BCD code. These signals are applied to the inputs of inverter drivers 60 of the type manufactured by National Semiconductor Corp. and bearing part number CD4049BC. These inverter drivers 60 provide enough signal strength to drive light emitting diode channel indicators 62. The anodes of light emitting diodes 62 are coupled to a source of supply voltage VD as is shown. In this manner, light emitting diode 62 gives a visual indication of exactly what channel is being monitored.

System clock generator 24 is capable of generating a clock signal at output 22 which may be varied from a first rate to a second faster rate. The slower rate corresponds to the situation when the device is simply repetitively scanning all channels. It might be desired, however, to cause the scanner to stop on a particular channel so that that channel and the sensor associated therewith may be monitored for a longer period of time. To accomplish this, it is only necessary to close one of a plurality of momentary stop channel switches 64. Since one side of each stop channel switch 64 is coupled to a source of supply VD its momentary closure will cause a high signal to appear at corresponding set input of a plurality of R-S Latches 66. R-S Latches 66 may be of the type manufactured and made commercially available by National Semiconductor Corp. and bearing part number CD4043BC. Thus, if it were desired to stop at the first channel, input signal X0 which is coupled to set input S0 is momentarily caused to go high by closing the stop channel switch 64 to which it is coupled. This causes R-S Latch output Q0 to go high. Similarly, if it were desired to stop on channel 6, input signal X5 coupled to R-S Latch input S5 is momentarily caused to go high by closing the stop channel select switch to which it is coupled. This in turn causes R-S Latch output Q5 to go high. R-S Latch outputs Q0-Q7 are coupled to the inputs of multiplexer 56. In this manner, multiplexer 56 sequentially couples outputs Q0-Q7 to its own output line 68 under the control of BCD counter 20. Output 68 of multiplexer 56 is applied to the anodes of diodes 70 and 72 having cathodes which are respectively coupled to the reset input of a first latch and the set input of a second latch contained in dual latch 74 of the type manufactured and made commercially available by National Semiconductor Corp. and bearing part number CD4043BC. Input signals X0-X7 which are applied to the set inputs of R-S Latches 66 are likewise applied to an 8 input OR gate 78, the output of which is applied to the set input of the first latch and to the anode of diode 80 which has a cathode coupled to the reset input of the second latch in dual latch 74. Assuming system clock generator 24 is of the type referenced above, the cathode of diode 82 along with one side of resistors 84 and 86 are coupled to input pin 7. The other end of resistor 84 is coupled to the source of supply voltage VD which is also applied to pins 4 and 8 of the device. The second end of resistor 86 is coupled to pin 6 and to a first side of capacitor 88. The other side of capacitor 88 is coupled to pin 1 which is also coupled to ground. Finally pin 2 is coupled to pin 6 by means of line 90.

If none of the stop channels 64 are closed, and the device is simply in its normal mode of scanning channels, both outputs of dual latch 74, Q1 and Q2, are low. This is due to the fact that when the system is turned on, a switch 92 having one end coupled to a source of supply voltage VD and its other end coupled to the reset inputs of flip flops 66, to the reset input R1 of dual latch 74 and, via diode 94, to the reset input R2 of the second latch Q2 in dual latch 74. Thus when the device is first turned on, logical zeros will appear at outputs Q0-Q7 of R-S Latches 66 and a logical one will be applied to the reset inputs R1 and R2 of latches Q1 and Q2. Reset switch may be of the type which only momentarily closes.

With both latches Q1 and Q2 of dual latch 74 in the reset mode, outputs Q1 and Q2 are low. Thus, a count disable signal is not generated over line 76 and BCD counter continues to cycle. A logical low at the anode of diode 82 causes the system clock 24 to generate the slower clock signal at its output 22. If one of the stop channel select switches is momentarily closed, for example that which corresponds to channel 4, X3 will momentarily go to a high logical level and this state will be stored in R-S Latch Q3. The momentary high state of signal X3 will cause a momentary high to appear at the output of OR gate 78, this results in a high signal being applied to the set input of the first flip flop in dual latch 74 causing Q1 to set and a high input being applied via diode 80 to the reset input (R2) of the second latch in dual latch 74 causing Q2 to go low. With Q2 low, BCD counter 20 is not disabled and continues to count. Further, with Q1 high, resistor 84 is effectively shorted leaving only resistor 86 and capacitor 88 to control the clock rate of system clock generator 24 resulting in a faster clock. Thus, BCD counter 20 will count at the faster rate until its output corresponds to the code associated with channel 3. At this point, multiplexer 56 couples its output 68 to Q3 causing a high logical level to be applied via diode 70 and 72 to the reset input of Q1 in dual latch 74 and to the set input of Q2 in dual latch 74. Since Q2 is caused to go high, a count disable signal is applied over line 76 to BCD counter 20 causing it to cease counting. Furthermore, resetting Q1 in dual latch 74 causes system clock generator to generate its slower clock. Thus, the parameter at channel 3 may now be continuously monitored due to the fact that BCD counter has stopped at channel 3.

The device may be returned to the auto scan mode in one of two ways. First, auto scan switch 92 may be closed resetting the R-S Latches 66 and resetting R-S Latches Q1 and Q2 in dual latch 74 which now permits BCD counter 20 to count at the slower rate. Secondly, a different stop channel select switch 64 may be momentarily closed setting Q1 and resetting Q2 in dual latch 74 resulting in BCD counter incrementing at the faster rate until the newly selected channel is reached.

In some cases, it is desirable to scan less than eight channels. A particular user may have a need only to scan, for example, four channels. To accomplish this, signals Y1-Y7 from BCD to decimal decoder 58 and signal Y8 corresponding to the output of Q4 of BCD counter 20 are coupled respectively and individually to one terminal of one of a plurality of switches 100. The opposite terminals of switches 100 are coupled in common and further coupled to the reset input (R) of BCD counter 20 over line 102. It should be noted that one of switches 100 is coupled to signal Y8 which actually corresponds to the output of Q4, the fourth least significant bit of BCD counter 20. Thus, outputs Q1, Q2 and Q3 of BCD counter 20 are capable of assuming eight distinct states corresponding to the eight channels prior to Q4 going high. Thus, if it were desired to scan all eight channels, it is merely necessary to close the switch coupled between Y8 and the reset input of BCD counter 20. After the eight channels are scanned, Q4 goes high causing counter 20 to immediately reset and repeat the cycle.

If, on the other hand, it would desire to scan less than eight channels, the user may close one of the other switches 100 and coupled one of signals Y1-Y7 to the reset input of BCD counter 20. For example, if we assume that the user wished to scan only four channels, it would be necessary to reset BCD counter 20 after Q1, Q2 and Q3 of BCD counter 20 generate in sequence the first four distinct codes corresponding to channels 1, 2, 3 and 4. By closing switch 100 coupled to signal Y4 which corresponds to the fifth distinct code, signal Y4 is coupled via switch 100 and line 102 to the reset input of BCD counter 20 causing Q1, Q2 and Q3 to reset after the fourth distinct code is generated.

Thus, there has been provided a versatile scanning device which is not only capable of measuring voltage and temperature, but one in which the user may select the number of channels scanned or even stop on a desired channel. Furthermore, the actual sensors may be positioned to accomplish a specific user application and furthermore may thereafter be altered to change the application. It is only necessary that the sensor outputs be coupled to inputs too.

The above description is given by way of example only. Changes in form and details may be made by one skilled in the art without departing from the scope of the invention as defined by the appended claims.

We claim:

1. An apparatus for scanning a plurality of parameters including temperature, comprising:
   first multiplexer means including a first plurality of channels, each channel having an input coupled to receive a signal representative of one of said plurality of parameters, said first multiplexer means sequentially and repeatedly coupling each input to an output thereof, each parameter being represented by a voltage at the input of one of said first plurality of channels in said first multiplexer;
   clock generator means coupled to said first multiplexer means for controlling the rate at which said first multiplexer means repeatedly sequences through said first plurality of channels;
   first display means coupled to the output of said first multiplexer means for displaying a digital representation of the value of each of said plurality of parameters; and
   first means coupled to said first multiplexer means for varying the number of said first plurality of channels which are repeatedly and sequentially scanned; and
   second means coupled to the output of said first multiplexer means, to said clock generator means, and to said first display means for selectively causing a voltage at an input of said first multiplexer means to appear as a temperature readout on said first display means, said second means comprising second multiplexer means having an output coupled to the output of said first multiplexer means and to said first display means and having a plurality of inputs, said second multiplexer means also coupled to said clock generator means such that said first and second multiplexer means operate synchronously, and a plurality of switches each having a first terminal coupled to one of the inputs of said second multiplexer means and each having a second terminal adapted to be coupled to a source of supply voltage.

2. An apparatus for scanning a plurality of parameters, comprising:
   first multiplexer means including a first plurality of channels, each channel having an input coupled to receive a signal representative of one of said plurality of parameters, said first multiplexer means sequentially and repeatedly coupling each input to an output thereof;
   clock generator means coupled to said first multiplexer means for controlling the rate at which said first multiplexer means repeatedly sequences through said first plurality of channels;
   first display means coupled to the output of said first multiplexer means for displaying a digital representation of the value of each of said plurality of parameters;
   means coupled to said multiplexer means for varying the number of said first plurality or channels which are repeatedly and sequentially scanned; and
   second display means coupled to said clock generator means for indicating which of said first plurality of channels is being monitored by said first display means.

3. An apparatus according to claim 1 further comprising stop select means coupled to said clock generator means for disabling said clock generator means when a selected channel has been reached.

4. An apparatus according to claim 3 wherein said stop select means comprises:
   third multiplexer means having a plurality of inputs and an output coupled to said clock generator means; and
   a plurality of switches each having a first terminal coupled to one input of said third multiplexer means and each having a second terminal coupled to a source of supply voltage, said third multiplexer means being controlled by said clock generator means so as to operate synchronously with said first and second multiplexer means.

5. An apparatus according to claim 4 wherein said clock generator means comprises:
   an oscillator having an output capable of providing a first clock signal having a first frequency and a second clock signal having a second faster frequency;
   a binary coded decimal counter having an input coupled to the output of said oscillator for receiving therefrom said first and second clock signals, said BCD counter having an output for providing a BCD code, said first, second and third multiplexer means coupled to the output of said BCD counter and controlled thereby; and
   means coupled to said oscillator and to said third multiplexer means for causing the output of said oscillator to change from said first clock signal to said second clock signal when one of the switches in said stop select means is closed.

6. An apparatus according to claim 5 wherein said second display means comprises:
   a binary coded decimal to decimal decoder having inputs for receiving the binary coded output of said binary coded decimal counter and having a plurality of outputs, said binary coded decimal to decimal decoder functioning in synchronizm with said first, second and third multiplexers; and
   a plurality of light emitting diodes, each having a cathode coupled to one of the outputs of said binary coded decimal to decimal decoder and each having an anode coupled to a source of supply voltage.

* * * * *